(12) United States Patent
Freking et al.

(10) Patent No.: US 8,767,509 B2
(45) Date of Patent: Jul. 1, 2014

(54) METHOD AND DEVICE FOR MEASURING A CONTOUR OF THE GROUND

(75) Inventors: Benno Freking, Weyhe-Leeste (DE); Tobias Fassbender, Bremen (DE)

(73) Assignee: Atlas Elektronik GmbH, Bremen (DE)

( * ) Notice: Subject to any disclaimer, the term of this patent is extended or adjusted under 35 U.S.C. 154(b) by 227 days.

(21) Appl. No.: 13/496,578

(22) PCT Filed: Aug. 18, 2010

(86) PCT No.: PCT/EP2010/062050
§ 371 (c)(1),
(2), (4) Date: Jun. 4, 2012

(87) PCT Pub. No.: WO2011/035996
PCT Pub. Date: Mar. 31, 2011

(65) Prior Publication Data
US 2012/0230152 A1 Sep. 13, 2012

(30) Foreign Application Priority Data

Sep. 24, 2009 (DE) .......................... 10 2009 042 968

(51) Int. Cl.
*G01S 15/89* (2006.01)
(52) U.S. Cl.
USPC .......................................................... 367/88
(58) Field of Classification Search
USPC .......................................................... 367/88
See application file for complete search history.

(56) References Cited

U.S. PATENT DOCUMENTS

| 3,381,264 A | 4/1968 | Lavergne et al. |
| 5,200,931 A | 4/1993 | Kosalos et al. |

(Continued)

FOREIGN PATENT DOCUMENTS

| AU | 2010297524 A1 * | 5/2012 |
| CA | 2775115 A1 * | 3/2011 |

(Continued)

OTHER PUBLICATIONS

Philip N Denbigh; "Signal Processing Strategies for a Bathymetric Sidescan Sonar;" IEEE Journal of Oceanic Engineering, IEEE Service Center, Piscataway, NJ; vol. 19; No. 3; Jul. 1, 1994; pp. 382-391.

(Continued)

*Primary Examiner* — Daniel Pihulic
(74) *Attorney, Agent, or Firm* — Fitch, Even, Tabin & Flannery LLP

(57) ABSTRACT

A method for measuring a contour of the ground by means of a transmitting arrangement for the directed emission of sound signals and by means of a receiving arrangement including at least two transducers for receiving the sound signals reflected from the contour of the ground. Sound signals are emitted consecutively using a plurality of N soundings from predetermined positions $P_1, P_2, P_3, P_4, \ldots, P_N$ having different aspect angles $\phi_N$ in relation to and distances $r_N$ from the contour of the ground. A phase difference, the path differences resulting therefrom, the corresponding angles of incidence, and the coordinates of incidence are ascertained from the receive signals of the transducers for a plurality of sampling times and for the N soundings. Afterwards, the data density is ascertained within a predefined range containing the coordinate of incidence. The range which has the maximum data density is selected, and the coordinate of incidence (x, y, z) corresponding to the range is used for ascertaining the contour of the ground.

10 Claims, 6 Drawing Sheets

(56) References Cited

U.S. PATENT DOCUMENTS

Figure 1:
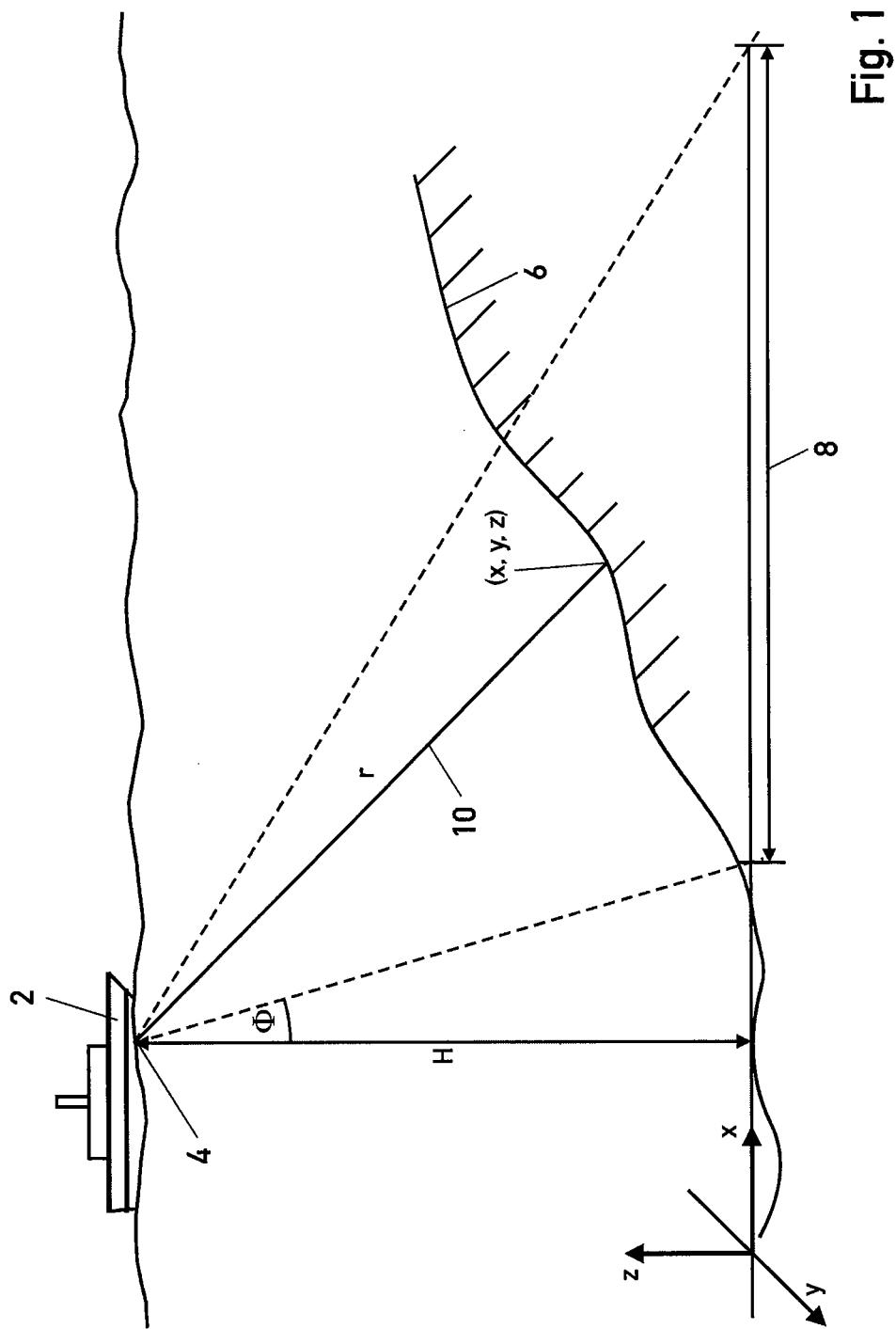

| | | | | |
|---|---|---|---|---|
| 5,546,357 A | * | 8/1996 | Zehner | 367/88 |
| 2006/0109743 A1 | * | 5/2006 | Kosalos et al. | 367/88 |
| 2010/0329080 A1 | * | 12/2010 | Frank et al. | 367/99 |
| 2012/0230152 A1 | * | 9/2012 | Freking et al. | 367/88 |

FOREIGN PATENT DOCUMENTS

| | | |
|---|---|---|
| DE | 1548452 A1 | 6/1969 |
| DE | 19959014 A1 | 7/2001 |
| DE | 102005041390 A1 | 3/2007 |
| GB | 2197952 A | 6/1988 |
| WO | WO 2011035996 A1 * | 3/2011 |

OTHER PUBLICATIONS

C. Sintes et al; "Strategies for Unwrapping Multisensors Interferometric Side Scan Sonar Phase;" IEEE Conference and Exhibition Sep. 11-14, 2000, Piscataway, NJ; vol. 3; Sep. 11, 2000; pp. 2059-2065.

Griffiths, A comparison between radar and sonar synthetic aperture interferometry, 19970411, pp. 4/1-4/5, XP006509424 (Apr. 11, 1997).

International Search Report corresponding with International Application No. PCT/EP2010/062050.

* cited by examiner

METHOD AND DEVICE FOR MEASURING A CONTOUR OF THE GROUND

CROSS-REFERENCE TO RELATED APPLICATIONS

This Application is a U.S. national phase application filed under 35 U.S.C. §371 of International Application No. PCT/EP2010/062050, filed Aug. 18, 2010, designating the United States, which claims priority from German Patent Application No. 10 2009 042 968.9, filed Sep. 24, 2009, the complete disclosures of which are hereby incorporated herein by reference in their entirety for all purposes.

The invention relates to a method for measuring a contour of the ground by means of an acoustic transmitting and receiving arrangement attached to a watercraft of the type cited in the preamble of Claim 1 and to a device for embodying the method according to Claim 6.

The invention has application to the measurement of a contour of the ground inside a predefined underwater area, or to the search for sunken objects, among other tasks. If the underwater area in front of the water craft is illuminated, this assists in providing collision avoidance and/or navigation, among other tasks.

In order to obtain a detailed object detection, a high angular resolution of the receiving arrangement is required. This is conventionally achieved by means of a receiving arrangement having a plurality of transducers and a beamformer connected down-stream. The beamformer processes the respective received signals of the transducers in such a manner that the receiving arrangement in a specified underwater area defines a fan formed of a plurality of directivity characteristics or beams, that are angularly offset with respect to one another. The receiving arrangements used can be implemented e.g. as a linear array or conformal array, or as horseshoes or cylinder arrays. DE 199 59 014 A1 shows, e.g., a method for determining depth values of a stretch of water with a fan echo sounder. In this method, for each echo fan for a sequence of fan beams, sound transit times are measured and the depth and contour values are calculated. Since the resolution of these transducer arrays corresponds to the beam-width however, a very high cost is associated with a sufficiently accurate angular resolution.

In addition to these methods based on a transducer array as the receiving arrangement, the resolution of which is limited by the construction of the receiving arrangement, so-called high-resolution methods for angle determination are known. These methods include the MUSIC (Multiple Signal Classification) method. The accuracy of the results with these methods however is also dependent on the number of transducers in the receiving arrangement. The more transducers the receiving arrangement has, and the longer the signal block to be processed, the more accurate are the results. The disadvantage of these methods is also their computational cost, which makes their use in real-time systems more difficult.

Alternatively, it is known to carry out the measurement of the contour of the ground by means of phase analysis of the sound waves received by the transducers. DE 10 2005 041 390 A1 discloses a method for generating a sonar image. To achieve this, a sonar carried by a watercraft is used that has a transmitting antenna for emitting sound impulses and a receiving antenna with a plurality of hydrophones. In one exemplary embodiment the generation of a three-dimensional sonar image using an interferometric measurement method is disclosed. To achieve this a second receiving antenna, preferably implemented identically to the first, is required. A depth value to be ascertained is determined by correlation of the received signals from both receiving antennas.

In the article "Signal Processing Strategies for a Bathymetric Sidescan Sonar" by Philip N. Denbigh in the IEEE Journal of Oceanic Engineering, 19(3): 382-390, July 1994, principles of direct phase difference measurement in interferometric systems are described in more detail. With this type of interferometric technique a second transducer is required, working independently of the first. This delivers an additional received signal, which due to the different distances from the object, delivers a signal which is time-delayed relative to the first antenna. If the distance between the transducers is a multiple of the wavelength of the received sound waves however, the measured phase shift, which lies between 0 and $2\pi$, indicates a large number of possible receiving angles. Such a multiple ambiguity in the angle determination is conventionally avoided by using multiple transducers which are located a suitable distance apart.

DE 1 548 452 A discloses a method for determining contours of the sea bed. The contours sought can be recorded directly by means of a special arrangement of the transmitting and receiving device. According to this arrangement, the transmitting and receiving devices are arranged at such a distance from one another that after reflection at the sea bed, waves that are emitted by the same transmitter and received by two receivers at a distance from each other, are received in phase. A disadvantage of this arrangement is the need to observe a particular arrangement relationship, which must be constantly adjusted. When using multiple transducers however, there is also the disadvantage of higher costs.

The problem addressed by the invention therefore is to provide an inexpensive method for measuring a contour of the ground, which by using phase analysis delivers unambiguous measurement results.

The invention solves this problem by means of the features of a method according to Claim 1 and by means of a corresponding device having the features of Claim 6.

In these, by means of a transmitting arrangement pulsed sound signals are first emitted in a directed manner. The transmitting arrangement has a very narrow response characteristic along the direction of the heading, so that only the echoes from a narrow strip of ground are received.

In a plurality of N soundings from predefined positions with aspect angles and distances to the contour of the ground that are different from one another, a sound signal is emitted into the underwater area and the reflected components thereof are received by means of the receiving arrangement, wherein the receiving arrangement advantageously works with two separate transducers. The measurement of the contour of the ground is effected on the basis of the received signals from the two transducers by using a pure phase analysis and a subsequent density analysis of the measurements.

Depending on the distance of the transducers from the receiving arrangement and on the frequency or the wavelength of the emitted sound signals, a pure phase analysis may possibly deliver multiply ambiguous results. The method according to the invention however does not at first take account of this multiple ambiguity in the angle determination.

The multiple measurement of the contour of the ground from different positions of the transmitting arrangement arising from the ambiguous results of the phase analysis is used to unambiguously determine the contour of the ground by using a density analysis. In this method, for a plurality of predefined sampling times and for the N soundings from different positions a phase difference between two received signals delivers multiple ambiguous path differences depending on the distance from the transducers to the receiving arrangement. From these ambiguous path differences, for these sampling times and for the N soundings, associated angles of incidence and incidence coordinates can be determined. For the sampling times and the N soundings, a data density in a predefined region containing the incidence coordinate is determined for each of the ambiguous incidence coordinates. In the region at which the true ground point is located, the density of the measurements increases. The locations of the additional ambiguous incidence coordinates which are produced as a result of the phase analysis, have a lower data density and are marked as invalid. The method according to the invention therefore delivers a method for ascertaining which is the true incidence coordinate (x, y, z) on the contour of the ground.

The method according to the invention has the advantage that, in spite of a previously mentioned multiple ambiguity in the angle determination when using a receiving arrangement with only two transducers, unambiguous measurement results can be obtained by performing the measurement of the contour of the ground from different positions with aspect angles and distances to the contour of the ground that are different from one another, and then carrying out a density analysis of the measurement data.

In a further embodiment of the invention, the device according to the invention has the advantage that it can be produced by using a receiving arrangement with two separate transducers. The method according to the invention also delivers unambiguous measurement results of the contour of the ground when the distance between the transducers is greater than half the wavelength of the received signal, or of the received sound waves. Due to the preferably small size, such a receiving arrangement can also be carried for example by small, autonomously acting or remote-controlled underwater vehicles.

In a further embodiment of the invention, a transducer array is used as a receiving device. If the transmitting arrangement is not designed in such a manner that a directed emission of sound signals into an underwater area is possible, or if the transmitting arrangement has a broad response characteristic in the heading direction of the watercraft, then a receiving arrangement with a plurality of transducers and a downstream direction generator or beamformer, which generates a plurality of beams extending in a fan-like manner in the underwater area, has the advantage of increasing the resolution of the sonar system in accordance with the beam width.

In a further embodiment of the invention, the regions in which the density of the measurements is determined correspond to surface elements with a predefined size. These surface elements are of equal size for all incidence coordinates. Advantageously, the size of the surface element is specified in accordance with the computational cost and the required resolution.

In a further embodiment of the invention, the N positions of the N soundings that are different from one another are defined by a forward motion of the transmitting and receiving arrangement. This preferably corresponds to a forward motion of the watercraft. The advantage of an embodiment of this kind lies in the fact that the transmitting and receiving arrangements can be rigidly attached instead of being pivotable.

Figure 2:
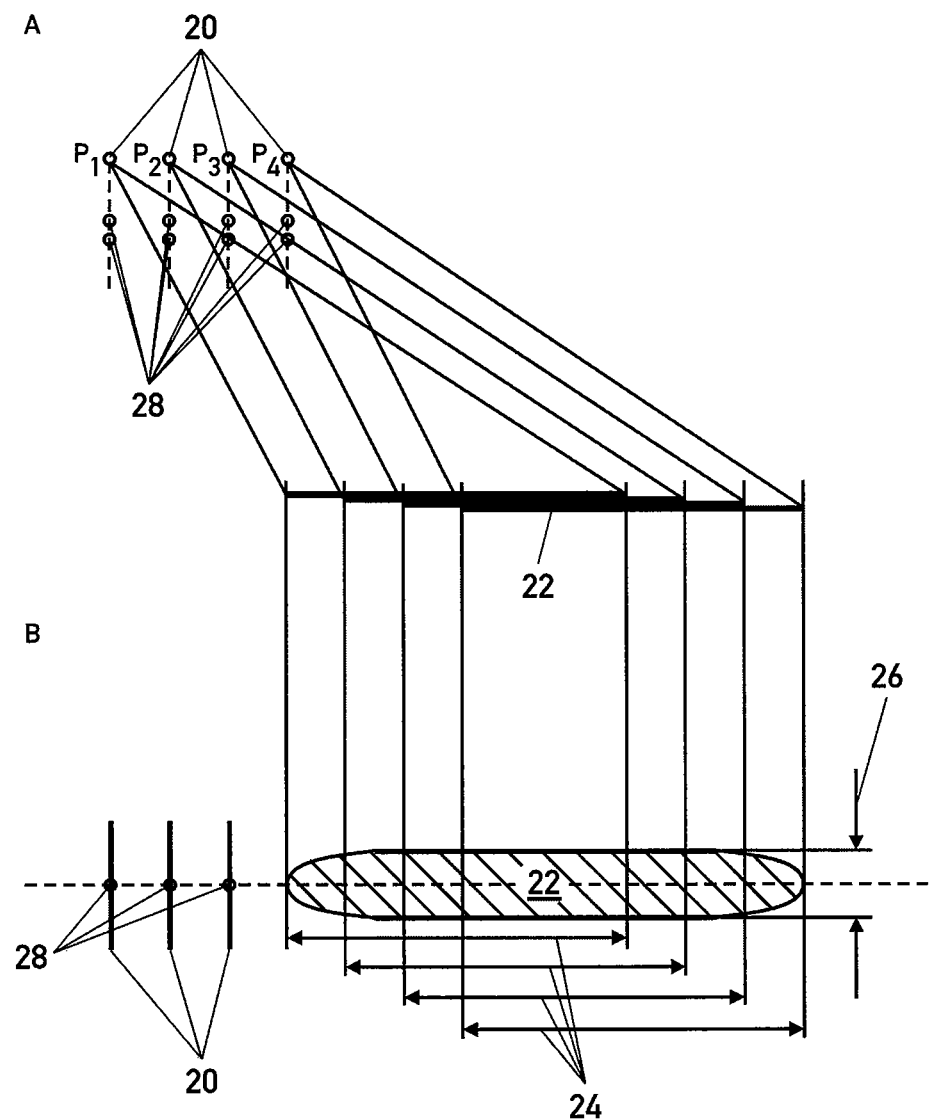
Figure 3:
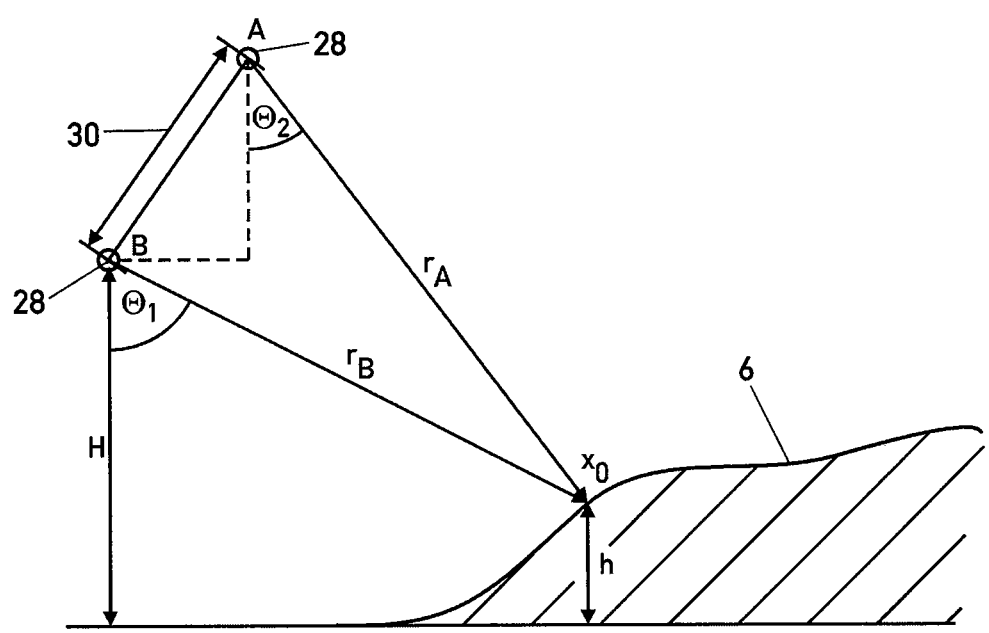
Figure 4:
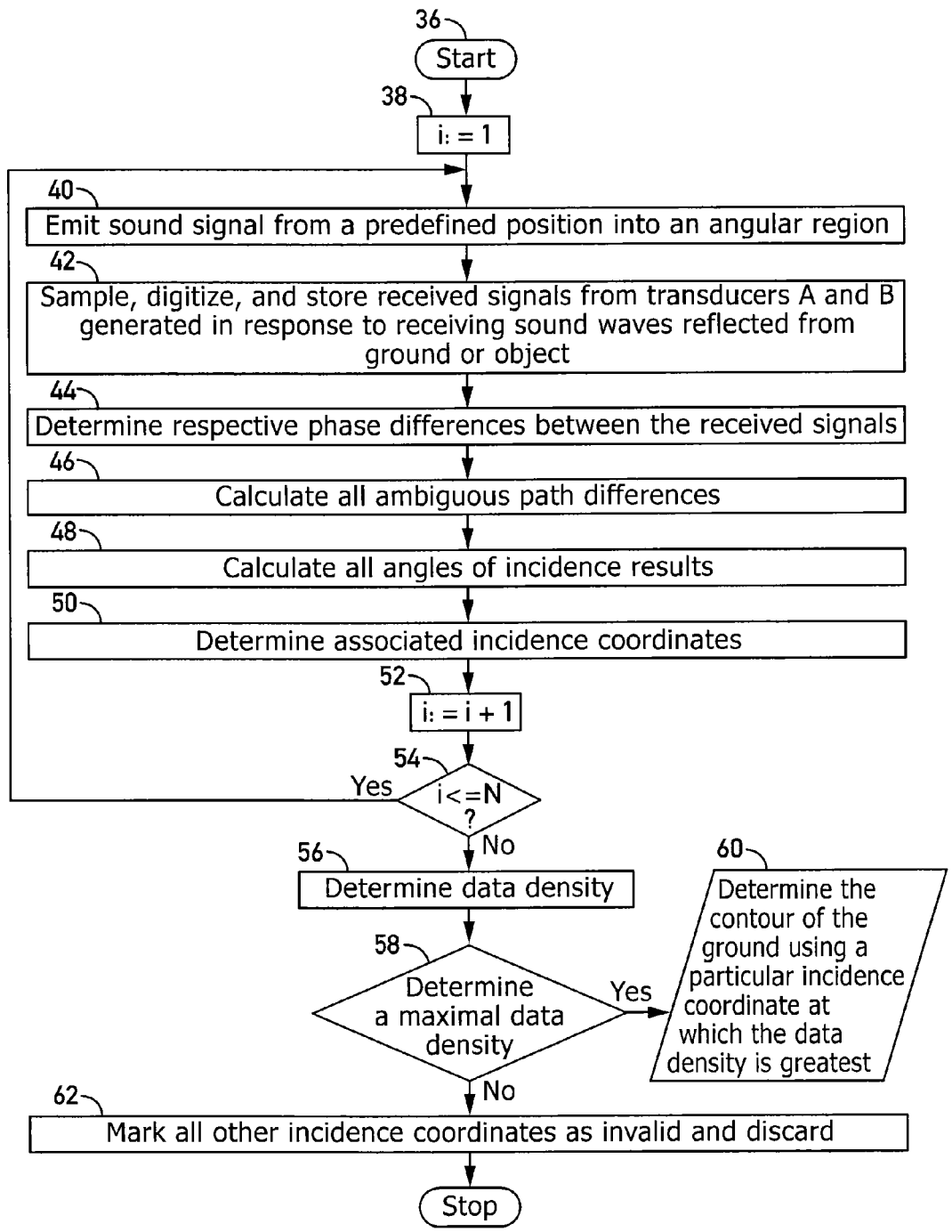
Figure 5:
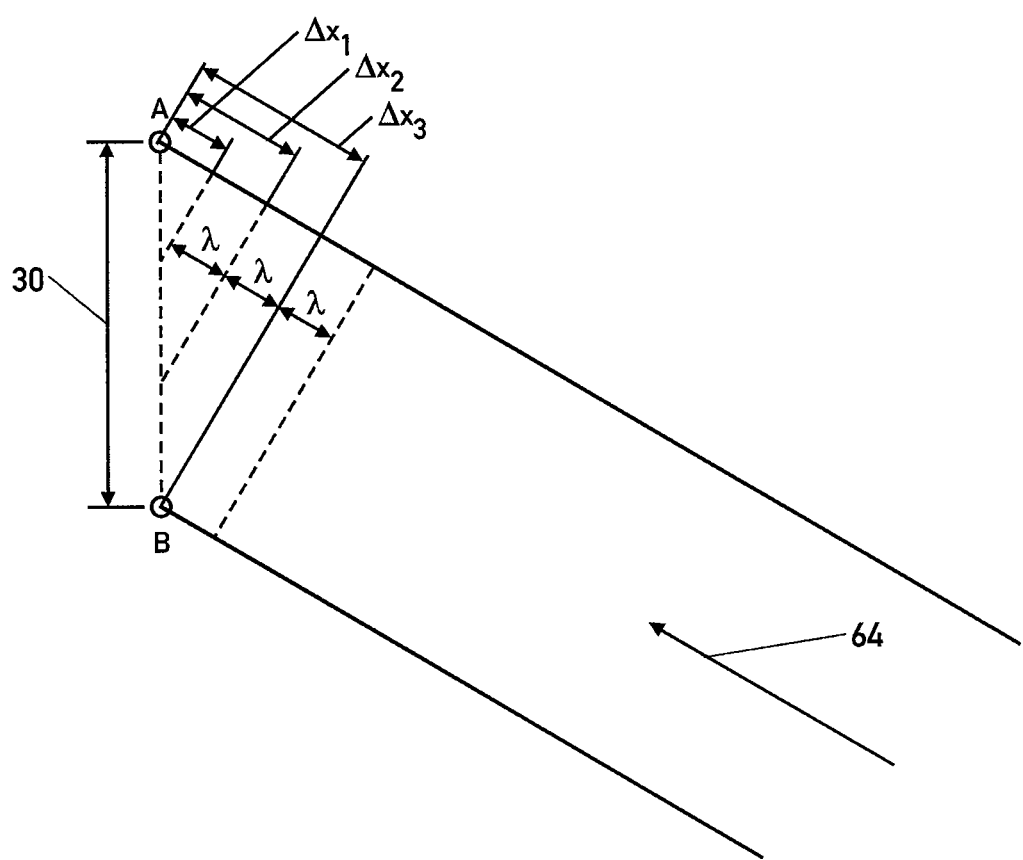
Figure 6:
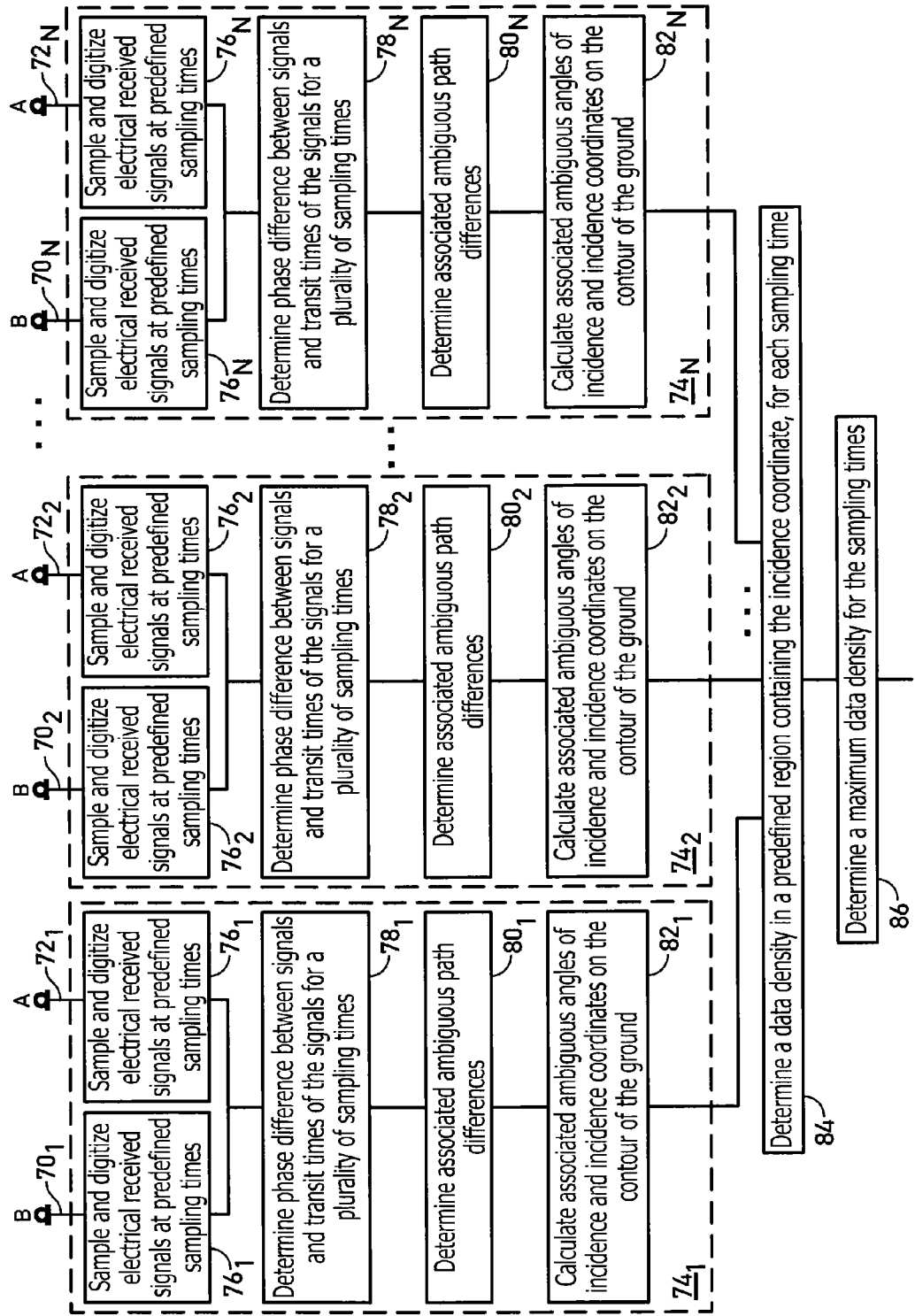

Further advantageous embodiments result from the dependent claims and from the exemplary embodiments explained with the aid of the attached drawings. They show:

FIG. 1 a schematic illustration of a watercraft with the underwater area to be scanned;

FIG. 2 A-B a schematic illustration of the sonar system,

FIG. 3 a schematic illustration of the receiving arrangement;

FIG. 4 a flow diagram of the method according to the invention;

FIG. 5 a schematic illustration of a sound wavefront incident on the transducers;

FIG. 6 a block circuit diagram of the device according to the invention for carrying out the method.

FIG. 1 shows a schematic illustration of a watercraft 2 travelling in an area of sea with a forward-looking sonar system 4. This sonar system 4 has a transmitting and receiving arrangement and an associated signal processing system for capturing data from a contour of the ground 6. The invention is not however limited to the exemplary embodiment based on a forward-looking sonar system 4. In addition, a sound emission e.g. via the stern of a watercraft 2 is possible.

In FIG. 1 furthermore, the measurement geometry with the distance r from a ground point to the sonar system 4 is shown. The distance r can also be determined via the transit time of the reflected sound signal. The sound pulse takes a certain time to reach the ground, to be reflected and after a further transit time to arrive at the receiving arrangement. Based on this measurable total transit time, by means of the known sound velocity the distance r from an object or from the ground point can be determined.

In addition, a reference height H and the aspect angle $\phi$ in the vertical direction to the sonar system 4 are shown.

To measure the contour of the ground 6, pulsed sound signals are emitted by the sonar system 4 into an underwater area 8 in a directed manner and the reflected sound waves 10 from a plurality of individual ground points (x, y, z) are received. The sonar system 4 has a very sharply focussed sound emission transverse to the direction of travel and a broad directivity characteristic in the longitudinal direction of the craft. This means that only the echoes of a narrow strip of ground are received.

The extent of the irradiated underwater area 8 depends on the formation of the sonar system 4, which is shown in detail in FIG. 2.

FIG. 2 A-B show a schematic illustration of the sonar system 4. FIG. 2 A shows a side view of the sonar system 4 and FIG. 2B shows a plan view of the same arrangement.

The transmitting arrangement 20 has a plurality of transducers arranged on an antenna support, which emit sound signals in the form of a transmitter beam 22 into a predefined underwater area 8. The resulting transmitter beam 22 in the form of an ellipse has a length 24 and a width 26 that depends on the beam width of the response characteristic associated with the transmitting arrangement.

By this transmitting arrangement 20, with a plurality of N soundings from predefined positions $P_1, P_2, P_3, P_4, \ldots, P_N$ with aspect angles $\phi_N$ that are different from one another and distances $r_N$ from the contour of the ground 6, a sound signal is successively emitted into the underwater area 8, wherein the different positions $P_1, P_2, P_3, P_4, \ldots, P_N$ of the N soundings preferably result from the forward motion of the watercraft 4. Alternatively, it is conceivable to pivotably attach the sonar system 4 on the watercraft 2 in order to generate the different positions $P_1, P_2, P_3, P_4, \ldots, P_N$ of the N soundings directly by means of a corresponding motion of the sonar system 4. The components of the sound signal reflected by the contour of the ground 6 within the underwater area 8 are received via the receiving arrangement 28, which is shown in detail in FIG. 3.

FIG. 3 shows a schematic illustration of the receiving arrangement 28. In order also to determine, in addition to the distance r a height h of the contour of the ground 6, a receiving arrangement 28 with at least two transducers spaced apart from each other is required. In this exemplary embodiment of the invention the receiving arrangement 28 consists of two separate transducers A and B, as are shown in FIG. 3. They are spaced a distance 30 apart, which is greater than half the wavelength λ, of the sound signal emitted by the transmitting arrangement 20. This slight displacement in position of the transducers A and B results in significant transit time differences in the received signal, which can be precisely determined on the basis of phase measurements.

It is, however, equally possible to use an existing set of transducers, from which two transducers are selected. The method according to the invention can also be carried out with two transducer arrays which are arranged one above the other according to FIG. 2. If the nature of the construction of the watercraft 2 requires it, then the transducers can also be arranged slightly offset. The geometry of the receiving arrangement 28 is taken into account accordingly in the signal processing of the received signals.

The transducer A delivers a received signal which is time-delayed by the different distances $r_A$ and $r_B$ from the ground point $x_0$ relative to the transducer B. The components of the emitted sound signal reflected from the point $x_0$ reach the transducer B first and then, delayed by $\Delta t$, the transducer A. From the phase difference in the associated received signals a height h can be determined, which is relative to the reference height H in the vertical direction below the receiving arrangement 28. The calculation follows from the geometry of the measurement arrangement:

$$h = H - r_B \cos \theta_1$$

FIG. 4 shows a flow diagram for describing an exemplary embodiment of the sequence of the method according to the invention, which is based on a multiple measurement of ground elements from different distances $r_N$ and aspect angles $\phi_N$. After an initialisation block 36, a counter variable is assigned the value 1 in block 38.

To measure the contour of the ground, according to block 40 a sound signal is emitted from a pre-defined position $P_1$ by means of the transmitting arrangement 20 into an angular region which is preferably narrow in the heading direction and broad in the vertical direction.

The sound waves reflected from the ground or object are received by two transducers A and B, which each generate a received signal therefrom which in block 42 is sampled, digitised and stored at predefined sampling times.

Then in Block 44, the respective phase difference between the received signals of the two transducers for the sampling times is determined. Depending on the distance 30 between the two transducers A and B however, an ambiguity occurs. This is shown in detail in FIG. 5.

FIG. 5 shows a schematic illustration of a sound wavefront 64 incident on the transducers A and B. If the distance 30 between the two transducers A and B is greater than half the wavelength λ of the received sound wavefront 64, then multiple ambiguities occur. This means that the determined phase difference of the received signals between the transducers A and B is ambiguous and thus delivers, depending on the distance 30 between the transducers, a number of ambiguous path differences $\Delta x_1$, $\Delta x_2$, $\Delta x_3$.

In this exemplary embodiment according to FIG. 5, $\Delta x_3$ corresponds to the true path difference in the received signals between the transducers A and B. This path difference $\Delta x_3$ produces, in combination with the distance 30 between the transducers, an associated receiving angle.

In Block 46 according to FIG. 4, all ambiguous path differences are calculated for the previously determined phase differences. Then, in a further block 48 for the respective path differences all angles of incidence resulting from these path differences are calculated, from which in block 50 the associated incidence coordinates are determined. For each incidence coordinate, the sampling time and the position or sounding are stored.

Then in block 52 the counter variable i is increased by a value and tested in the following block 54, as to whether the counter variable has reached the value N of the number of soundings to be carried out. If this is not the case, a jump is made back to the instruction in block 40 in a loop, in order to determine the incidence coordinates for a following sounding from another position. If the counter variable i has reached the value N however, in block 56 a data density is determined about the incidence coordinates. The data density is a measure of the number of data points collected within a predefined region containing the respective incidence coordinate.

The determination of the data density is performed for a plurality of N soundings and for all sampling times of these soundings under consideration and for each of the ambiguous incidence coordinates. In block 58 a maximal data density is determined from these. At a maximum, the particular incidence coordinate at which the data density is greatest is output as valid and used to determine the contour of the ground 60. All other ambiguous incidence coordinates for this sampling time are marked as invalid in block 62 and discarded.

FIG. 6 shows a block circuit diagram to describe the device for carrying out the method according to FIG. 4.

The transducers A and B each deliver for the N soundings an electrical received signal $70_1$, $70_2$, ..., $70_N$ or $72_1$, $72_2$, ..., $72_N$, the further signal processing of which for the N soundings takes places according to blocks $74_1$, $74_2$, ..., $74_N$.

The remainder of block 74 is described based on the first sounding. The statements also apply to the further two to N soundings.

The electrical received signals $70_1$ and $72_1$ of the transducers A and B are each sampled and digitised in a processing block $76_1$ at predefined sampling times.

In the calculation unit $78_1$, for a plurality of the sampling times both the phase difference between the signals $70_1$ and $72_1$ and the transit times of these signals are determined.

In a further calculation unit $80_1$ for the previously determined phase differences for the sampling times, explained as before using FIG. 5, the associated ambiguous path differences are determined. For these ambiguous path differences, in a further calculation unit $82_1$ by means of the signal transit times and the receiving angles, the associated ambiguous angles of incidence and incidence coordinates on the contour of the ground are calculated for the sampling times.

By this means, for a plurality of the sampling times and for N soundings, the ambiguous incidence coordinates on the contour of the ground are determined. These ambiguous incidence coordinates of the N soundings, together with the values of the associated sampling times, are forwarded to a further calculation unit 84. There, for each sampling time, for each of the N soundings and for each of the ambiguous incidence coordinates, a data density in a predefined region containing the incidence coordinate is determined. The data density is thus a measure of the number of data points collected within the surface element. The incidence coordinates of the same soundings are not included when determining the density, however.

This predefined region is preferably a surface element, the size of which is sufficiently small and is specified according to the computational cost. It is, however, equal in size for all incidence coordinates.

A maximum detector 86 determines the maximum data density for the sampling times. At each sampling time the particular incidence coordinate the associated surface element of which has a maximal data density, is marked as valid and therefore corresponds to the true ground point (x, y, z). The other ambiguous incidence coordinates are marked as invalid.

The incidence coordinate (x, y, z) is composed as follows: the x-coordinate can be determined at each sampling time using the laws of trigonometry, the y-coordinate is depends on the width 26 of the transmitted beam 22 and the z-coordinate corresponds to the height h determined from the transit time difference determined between the transducers A and B.

The coordinate system is in this case fixed relative to the watercraft 2 or to the transmitting and receiving arrangement 4. It is however also possible to use an absolute coordinate system for carrying out the method, if it is appropriately taken into account in the signal processing stage.

The above described method can varied to the effect that instead of two separate transducers being used, a transducer array is used as the receiving arrangement 28. A direction generator or beam former is connected downstream of the receiving arrangement, which delays the received signals from the transducers and adds them to form grouped signals, so that a fan of directivity characteristics or beams is swept over the underwater area. The horizontal width of a beam is defined by its horizontal opening angle. This enables a higher resolution in the y-direction, for the case that no sufficiently high focussing of the transmitter beam is possible.

All features cited in the above description of the figures, in the claims and in the introduction to the description can be used both separately and also in any desired combination with one another. The invention is therefore not limited to the feature combinations described or claimed. Rather, all feature combinations are to be regarded as disclosed.

The invention claimed is:

1. A method for measuring a contour of the ground (6) by means of a transmitting arrangement (20) attached to a watercraft (2) for the targeted emission of sound signals into an underwater area (8) and by means of a receiving arrangement (28) attached to said watercraft (2), having at least two transducers for receiving the sound waves reflected by the profile of the ground (6) inside the underwater area (8), from which the transducers each generate a received signal (70;72), which is sampled, digitised and stored (42) at predefined sampling times, said method comprising $P_1 P_2 P_3 P_4 P_N$ $\phi_N$ $r_N$ successively emitting a sound signal (40) into the underwater area (8) by means of the transmitting arrangement (20), with a plurality of N soundings from predefined positions ($P_1$, $P_2$, $P_3$, $P_4$, ..., $P_N$) with aspect angles ($\phi_N$) and distances ($r_N$) from the contour of the ground (6) that are different from one another and receiving its components (42) of the N soundings reflected by the contour of the ground (6) by means of the receiving arrangement (28), determining for a plurality of the sampling times and for the N soundings from the received signals (70; 72) both a phase difference (44) and the path differences (46) of the received sound waves resulting therefrom between two transducers of the receiving arrangement (28)

determining for these sampling times and for the N soundings associated with the path differences, angles of incidence (48) and respective incidence coordinates derived therefrom (50), determining, for these sampling times and for the N soundings at the incidence coordinates, a data density in a predefined region containing the respective incidence coordinate (56), wherein said data density represents a measure of the number of data points collected within this region, selecting, by means of a maximum detector (86), the particular region in which the data density becomes a maximum and using the incidence coordinate associated with this region (60) to determine the contour of the ground (6).

2. The method according to claim 1,
wherein
the receiving arrangement (28) consists of two separate electroacoustic and/or optoacoustic transducers which are arranged at a distance (30) greater than half the wavelength ($\lambda$) of the received signal (70; 72).

3. The method according to claim 1,
wherein
the receiving arrangement (28) consists of a plurality of electroacoustic and/or optoacoustic transducers and the sound waves are received in a direction-selective manner.

4. The method according to claim 1,
wherein
the regions which contain the incidence coordinates and are used to determine the data density correspond to surface elements with a predefined size.

5. The method according to claim 1,
wherein
the predefined positions ($P_1$, $P_2$, $P_3$, $P_4$, ..., $P_N$) of the N soundings are reached by a forward motion of the transmitting and receiving arrangement (4).

6. A device for measuring a contour of the ground (6) by means of a transmitting arrangement (20) attached to a watercraft (2) for the targeted emission of sound signals into an underwater area (8) and by means of a receiving arrangement (28) attached to said watercraft (2), having at least two transducers for receiving the sound waves reflected by the profile of the ground (6) inside the underwater area (8), from which the transducers each generate a received signal (70;72), which can be sampled, digitised and stored (42) at predefined sampling times, wherein a transmitting arrangement (20) for sequentially emitting (40) a sound signal into the underwater area (8) with a plurality of N soundings from predefined positions ($P_1$, $P_2$, $P_3$, $P_4$, ..., $P_N$) with aspect angles ($\phi_N$) that are different from one another and distances ($r_N$) to the contour of the ground (6), a receiving arrangement (28) for receiving (42) each of the components of the N soundings of the sound signal reflected from the contour of the ground (6), two calculation units (78; 80) for determining, for a plurality of the sampling times and for the N soundings, both a phase difference (44) and the path differences (46) resulting therefrom of the received sound waves between two transducers of the receiving arrangement (28), a further calculation unit (82) for determining angles of incidence (48) associated with the path differences and for determining their respective incidence coordinates (50) from the angles of incidence for these sampling times and for the N soundings, a further calculation unit (84) for determining a data density (56) of the incidence coordinates for these sampling times and for the N soundings, in each case in a predefined region containing the respective incidence coordinate, wherein the data density represents a measure of the number of previously determined data points within this region, a maximum detector (86) for selecting the particular region in which the data density becomes a maximum and for determining incidence coordinates (60) of the contour of the ground (6) belonging to this region.

7. The device according to claim 6, wherein
the receiving arrangement (28) consists of two separate electroacoustic and/or optoacoustic transducers which are separated by a distance greater than half the wavelength ($\lambda$) of the received signal (70; 72).

8. The device according to claim 6, wherein
the receiving arrangement (28) consists of a plurality of electroacoustic and/or optoacoustic transducers, by means of which the sound waves are received in a direction-selective manner.

9. The device according to claim 6, wherein
the regions which contain the incidence coordinates and are used to determine the data density correspond to surface elements with a predefined size.

10. The device according to claim 6, wherein
the predefined positions ($P_1, P_2, P_3, P_4, \ldots, P_N$) of the N soundings can be reached by a forward motion of the transmitting and receiving arrangement (4).

* * * * *